(12) United States Patent
Laing et al.

(10) Patent No.: US 12,512,965 B2
(45) Date of Patent: Dec. 30, 2025

(54) TIME INTERVALS FOR STATEFUL SIGNATURE PRODUCTION

(71) Applicant: Hewlett-Packard Development Company, L.P., Spring, TX (US)

(72) Inventors: Thalia May Laing, Bristol (GB); Maugan Villatel, Meyrin (CH); Pierre Louis Robert Belgarric, Bristol (GB); Adrian John Baldwin, Bristol (GB); Adrian Laurence Shaw, Bristol (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 215 days.

(21) Appl. No.: 18/453,580

(22) Filed: Aug. 22, 2023

(65) Prior Publication Data

US 2024/0097884 A1   Mar. 21, 2024

(30) Foreign Application Priority Data

Sep. 16, 2022  (GB) .................................. 2213624

(51) Int. Cl.
| | | |
|---|---|---|
| H04L 29/06 | (2006.01) | |
| H04L 9/08 | (2006.01) | |
| H04L 9/32 | (2006.01) | |

(52) U.S. Cl.
CPC .............. *H04L 9/0816* (2013.01); *H04L 9/32* (2013.01)

(58) Field of Classification Search
CPC ....... H04L 9/0816; H04L 9/0861; H04L 9/32; H04L 9/3236; H04L 9/3247; H04L 9/3263; H04L 63/23; H04L 63/0846; H04L 63/126; G06F 21/64; H04W 12/041; H04W 12/10; H04W 12/106
See application file for complete search history.

(56) References Cited

U.S. PATENT DOCUMENTS

| | | | |
|---|---|---|---|
| 7,526,651 B2 | 4/2009 | Arditti Modiano et al. | |
| 10,810,508 B1* | 10/2020 | Maximo | ............... G06F 16/906 |
| 2010/0146061 A1* | 6/2010 | Mattsson | .............. H10F 30/221 |
| | | | 709/227 |
| 2012/0278441 A1* | 11/2012 | Li | ........................... H04L 65/70 |
| | | | 709/219 |
| 2016/0219024 A1* | 7/2016 | Verzun | ...................... H04L 9/34 |
| 2021/0025738 A1* | 1/2021 | Weinberg | ............... G01D 18/00 |
| 2021/0099315 A1 | 4/2021 | Xu et al. | |
| 2021/0111902 A1* | 4/2021 | Lee | ..................... H04W 12/069 |
| 2022/0014386 A1* | 1/2022 | Sehrawat | ............ H04L 63/0876 |
| 2023/0254154 A1* | 8/2023 | Kampanakis | ......... H04L 9/3239 |
| | | | 713/189 |

FOREIGN PATENT DOCUMENTS

| | | |
|---|---|---|
| WO | 2012/156255 A1 | 11/2012 |
| WO | 2018/063622 A1 | 4/2018 |

* cited by examiner

*Primary Examiner* — Malcolm Cribbs
(74) *Attorney, Agent, or Firm* — Quarles & Brady LLP (57) ABSTRACT

In an example, a computing device is described. The computing device comprises a memory to store a set of states and a corresponding set of non-overlapping time intervals. The computing device further comprises a timing unit to indicate a time at which a signature is to be produced. The computing device further comprises a processor to: identify which time interval of the set of non-overlapping time intervals includes the indicated time; generate a signing key based on a state associated with the identified time interval; and produce a signature, under a stateful signature scheme, with the signing key.

20 Claims, 7 Drawing Sheets

TIME INTERVALS FOR STATEFUL SIGNATURE PRODUCTION

BACKGROUND

A cryptoprocessor may use a private key to sign data. A verifier may use a public key associated with the private key to verify that the data was signed by the cryptoprocessor.

BRIEF DESCRIPTION OF DRAWINGS

Non-limiting examples will now be described with reference to the accompanying drawings, in which.

DETAILED DESCRIPTION

Disclosed herein are computing devices, machine readable media and methods to produce a signature under a stateful signature scheme.

As used herein, a stateful signature scheme refers to use of a function (e.g., a hash function in a stateful hash-based signature scheme) to construct a one-time signature (OTS) private key for use by a signer to produce a signature under the scheme. Such a signature scheme is considered stateful by virtue of the OTS private key generated under the scheme being single-use and ensuring that the OTS private key is not ever reused to sign data. Reusing an OTS private key of a stateful signature scheme may destroy the security of the scheme.

It may be necessary to prepare for the possibility that a signer such as a cryptoprocessor holding a private seed value used for generating an OTS private key may fail during the lifetime of the signer by introducing resiliency to the signing ecosystem. This may be relevant if the private seed value is to be used to generate OTS private keys over a long period of time and/or replacing the associated public key would be difficult.

A copy of the private seed value and a latest state used as an input to generate an OTS private key could be stored in a secure alternate location. However, simply copying the private seed value and the state may create a risk of state reuse, thereby destroying the security. In an example scenario where a signer has a private seed value and a state, these two values may have been backed up on an alternative device. The signer may increment the state, sign a message and then fail, losing both the private seed value and latest state (e.g., the latest counter value). The signer may then recover the key from the backup, which holds the previous, non-updated state, thus resulting in state reuse next time the signer signs, resulting in loss of all security.

Examples described herein provide an approach to provide resiliency in a stateful signature scheme whilst removing the chance of state reuse. In an example, a signer may use an available state of a stateful signature scheme to generate an OTS private key. A state may be available to generate such an OTS private key once during a time interval. No other state under the stateful signature scheme may be used to generate an OTS private key during the same time interval. Thus, the signer may use time as a reference to determine a state that is available to generate an OTS private key when a signature is to be produced (using the generated OTS private key). Further, a backup signer with access to the same reference time may continue signing under the same stateful signature scheme whilst removing the chance of state reuse and avoiding the need to have a backup of the state as described above.

Figure 1:
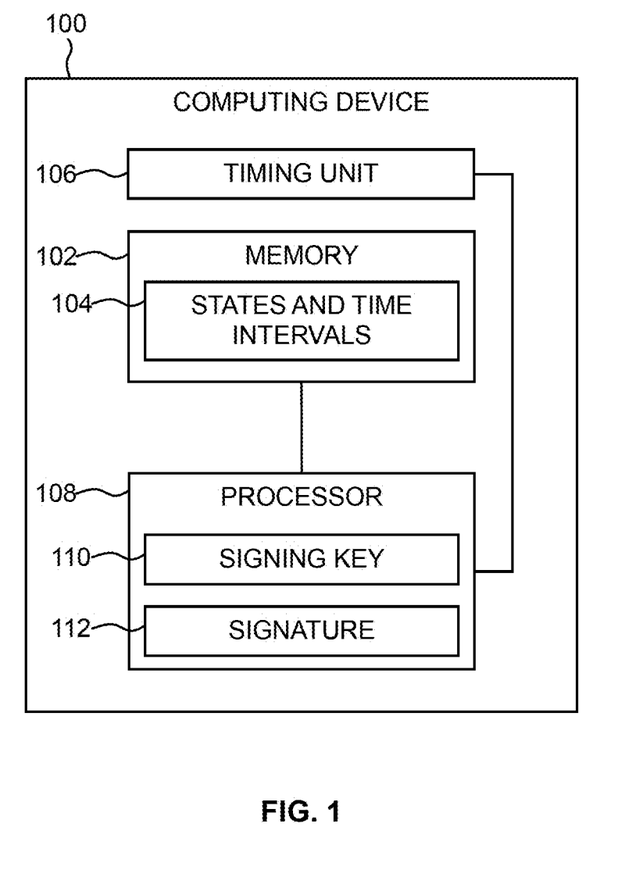
FIG. 1 is a schematic drawing of an example computing device to produce a signature under a stateful signature scheme.

FIG. 1 is a schematic drawing of an example computing device 100 to produce a signature under a stateful signature scheme.

In some examples, the computing device 100 may implement the functionality of a signer such as an entity that may be trusted to sign data (e.g., a message).

An example implementation may be that the computing device 100 is to provide a signing function as part of a computing infrastructure to provide updates. Such computing infrastructure may be set up to transmit a message comprising a software or firmware update to a recipient such as a user device (e.g., a laptop, phone, tablet, Internet-of-Things (IoT) device, printer or other hardware). In this example implementation, the computing device 100 may be a signer of the computing infrastructure and the signer is to sign the message comprising the update using an OTS private key under the stateful signature scheme. Thus, the recipient may receive an authentication path provided by the computing device 100, as part of the signature, to facilitate verification of the message.

Upon the signing procedure being completed by the signer, the computing infrastructure may send the (signed) message to the recipient, which may allow the recipient to verify the message is authentic (e.g., it originated from a trusted source) so that the recipient may proceed to implement the software or firmware update according to the code.

The computing device 100 comprises a memory 102 to store a set 104 of states and a corresponding set 104 of non-overlapping time intervals.

The set 104 of states may refer to states that may be used to generate signatures under a stateful signature scheme associated with a seed key pair (comprising the private seed value and the associated public key of the scheme). A state may be considered to be available or unavailable. A state may be considered to be available if the state has not yet been used to generate a signature. A state may be considered to be unavailable if the state has been used to generate a signature (because to do so would destroy the security of the stateful signature scheme). Thus, a state may be used once (and not more than once) to generate a signature. In some examples, the computing device 100 may implement a mechanism such as a counter to ensure that the state is not used again to generate a signature. However, certain examples described herein may not necessarily need a counter to prevent state reuse.

The corresponding set 104 of non-overlapping time intervals may refer to a start and finish time associated with a state. The time interval spans the start and finish time. The time intervals in the set 104 do not overlap, meaning that a start or finish time associated with a time interval does not fall within another time interval. Further, a finish time of a time interval does not overlap with a start time of a subsequent time interval. In other similar words, the set 104 of non-overlapping time intervals may comprise a series of consecutive non-overlapping time intervals.

The set 104 of states and a corresponding set 104 of non-overlapping time intervals may be stored in an appropriate format (such as a look-up table or via a rule) to allow the computing device 100 to determine which state is associated with which time interval. Such a look-up table may store any relevant data such as an identifier of the state (such as a value to input to a key generator, discussed below) and the associated start time of the time interval, the end time of the time interval, and/or any other appropriate information to allow the computing device 100 to look up the state and corresponding time interval. The rule may indicate how to calculate the state from time interval, and vice versa, which may save storage space compared with the look-up table example.

The computing device 100 further comprises a timing unit 106 (also referred to herein as a timer) to indicate a time at which a signature is to be produced.

In some examples, the timing unit 106 is to access time data from an external reference such as a trusted server. In some examples, the timing unit 106 maintains its own clock. The clock may be periodically updated with the correct time via the external reference. In either case, the timing unit 106 is to provide the time to be used when a signature is to be produced, as explained in more detail below.

The computing device 100 further comprises a processor 108. The processor 108 is to implement the functionality described below.

In some examples, the processor 108 may have access to instructions (e.g., stored in the computing device 100) readable and executable by the processor 108 to implement the functionality described herein.

The processor 108 is to identify which time interval of the set 104 of non-overlapping time intervals includes the indicated time.

For example, a signature may need to be produced and the processor 108 may be informed about the indicated time from the timing unit 106, where the indicated time may correspond to an expected time of signing. From the indicated time, the processor 108 is to identify the time interval from the set 104.

The processor 108 is further to generate a signing key 110 (e.g., an OTS private key) based on a state associated with the identified time interval. The state may be used as an input to a key generator to generate the signing key 110, as described herein. The state may be determined based on its association with the identified time interval e.g., via a look-up table or a rule, as described above.

The signature may be produced within the identified time interval (e.g., the signing time may be within the interval t0≤signing time<t1 where t0 and t1 mark the start time and end time of the time interval, respectively). If the signature is not produced within the identified time interval (e.g., if a message to be signed is received too late within the identified time interval), the signature may be produced in a subsequent time interval using the state associated with the next time interval (and the signing time may be within the interval t1≤signing time<t2 where t1 and t2 mark the start time and end time of the subsequent time interval, respectively). Such functionality may be enforced by the processor 108 to prevent the possibility of state reuse.

Some examples of generating a signing key are now described.

In some examples, the signing key (also referred to herein as a key in the context of producing a signature) is generated by inputting a seed (e.g., a private seed value from the seed key pair of a stateful signature scheme) and a state (e.g., a value such as 0, 1, 2 and so on) to a key generator (also referred to herein as a key generation function). The key generator is implemented by the processor 108. The resulting signing key may be referred to as a one-time use private key (e.g., an OTS private key in the Leighton-Micali Hash-based Signature Scheme (LMS), where the state used to generate the OTS private key is known as the leaf number in LMS). Ensuring that an OTS private key is used once (since the state is unique and not reused to generate a key) may maintain statefulness of a stateful signature scheme.

Example stateful hash-based signature schemes such as the Leighton-Micali Hash-based Signature Scheme (LMS) and the eXtended Merkle Signature Scheme (XMSS) specify that the signer is to maintain a state, which updates every time a signature is produced. The state is chosen from a finite set. For example, the state may be a counter which runs from 0 to $2^{20}$-1 for a Merkle tree of height 20 (where the tree height defines the number of states that are initially available under the stateful signature scheme prior to signing any messages). This state is used in conjunction with a private seed value to produce a one-time signing (OTS) private key, which is used to produce a signature. If the state, and therefore the OTS private key, is repeated and used to sign two distinct messages, the security of the scheme collapses. Thus, state management is a relevant consideration for maintaining the security of the scheme. In the examples of LMS and XMSS, the state is a counter (normally used in order e.g., starting at 0, 1, 2 and so on). As the number of states is finite, there is an upper bound on the number of signatures that can be produced for a given seed key pair (comprising a private seed value/key and an associated public key) and this upper bound is to not be exceeded.

In LMS, the seed used to derive the OTS private key is known as the signing key. Thus, any reference herein to a seed or private seed value may refer to a signing key in the context of LMS. However, as used herein, any reference to a key or signing key (in the context of producing a signature) may refer to an OTS private key such as used in LMS.

In some examples, the key generator is to generate the one-time use private key using a pseudorandom function (PRF). In some examples, an OTS private key may be generated from a seed (e.g., one_time_private_key=f(seed, i), where "i" is the state), where the function "f" may implement a PRF and/or a key derivation function (KDF) such as a hash-based message authentication code (HMAC)-based KDF (HKDF). However, any appropriate pseudorandom method may be implemented to generate the OTS private key from the seed and the state.

The processor 108 is further to produce a signature 112, under a stateful signature scheme, with the signing key 110. An example of a stateful signature scheme used to produce such a signature 112 is the stateful hash-based signature scheme, as described above.

The production of the signature 112 based on the time may maintain statefulness of the stateful signature scheme because the state used as the input to generate the signing key has a link to the time such that a state may not be reused to produce another signature. For example, the processor 108 may enforce that no more than one signing key can be produced (and used to generate a signature 112) within a time interval. If a message is to be signed in a subsequent time interval, the state used to generate the signing key in the subsequent time interval is unique such that the signing key generated based on the state does not destroy the security of the scheme.

Since time is used as a reference to determine which state is to be used, it may not be possible to go back in time to use a state that could have been used previously to generate a signing key 110. However, there are some scenarios described below where it may be possible to use a state associated with an elapsed time interval providing it can be confirmed that the state has not been previously used in the production of a signature 112.

If the computing device 100 fails for any reason, the same stateful signature scheme can be used by allowing a backup computing device (e.g., with the same or similar functionality to the computing device 100) to produce signatures. The backup computing device may be provided with the private seed value and the set 104 of states and corresponding set 104 of time intervals. Providing the backup computing device has access to the time (and that time is trusted) and the set 104 of states and corresponding set 104 of non-overlapping time intervals (such as a mapping between the states and time intervals), the backup computing device can continue producing signatures under the same stateful signature scheme without risking state reuse.

In this manner, resiliency of the stateful signature scheme may be maintained by certain examples described herein because the state does not need to be recovered from a failed computing device 100 (i.e., a signer) and a backup computing device (i.e., a backup signer) can be trusted to avoid state reuse. Resiliency may be helpful in certain real-world systems. For example, a signer such as a hardware security module (HSM) to sign software/firmware updates that are to be distributed may fail, which may have consequences in applications such as Secure Boot where a public key associated with the signer's private key may be used to check the validity of boot software. In the event of failure of the signer, the deployed public key is rendered useless for future updates and it may be difficult to provide a new and trusted public key to a verifier. The ability of a backup signer to continue signing under the same stateful signature scheme and still use the same public key (in accordance with certain examples described herein) to verify software/firmware may provide resiliency to the signing ecosystem. Thus, the ability to deploy a backup signer under the stateful signature scheme may provide confidence that it is still possible to leverage the deployed public key, even if the signer fails. That is, if the signer fails, certain examples described herein may still make it possible to provide access to the private key and continue to produce valid signatures that the verifier, with access to the same public key, can verify.

Further, state loss may be reduced or avoided by certain examples described herein (to maximize the lifetime of the stateful signature scheme associated with the seed key pair) because the backup computing device can continue using the same states that would have otherwise been used by the failed computing device. Certain examples described herein may provide a mechanism to ensure that the state cannot be reused. The mechanism may enforce waiting until the next time interval before authorizing the backup computing device to produce signatures in case the failure happened during a time interval during which a signature was produced.

The ability to authorize a backup computing device to implement the same stateful signature scheme in accordance with certain examples described herein may avoid the need to implement a more complex backup system which may involve producing large signatures as a result of there being multiple computing devices authorized at any one time under the same stateful signature scheme. Authorizing a single computing device 100 to produce signatures at any one time may allow smaller signatures to be produced for a given size of a Merkle tree underpinning the stateful signature scheme. In some examples where a recipient of a signed message is resource constrained, such as may be the case in a secure boot procedure implemented by the recipient, the recipient may need less time to perform signature verification as a result of the small signature size.

In some examples, the computing device 100 may comprise a cryptoprocessor (e.g., a signer) to perform a cryptographic operation such as signing data with a private key, encrypting data, etc. A cryptoprocessor may implement a level of security that specifies whether the cryptoprocessor is to do anything with data stored therein (e.g., keying material) in response to an event such as a physical attack on the cryptoprocessor. The level of security specified for the cryptoprocessor may depend on the use case of the cryptoprocessor.

Examples of cryptoprocessors (sometimes referred to as secure cryptoprocessors) that may implement a physical security mechanism include devices such as a cryptographic module or hardware security module (HSM). In some examples, the level of security provided by a cryptoprocessor may comply with a standard such as specified by the Federal Information Processing Standards (FIPS) Publications 140-2 or 140-3.

Figure 2:
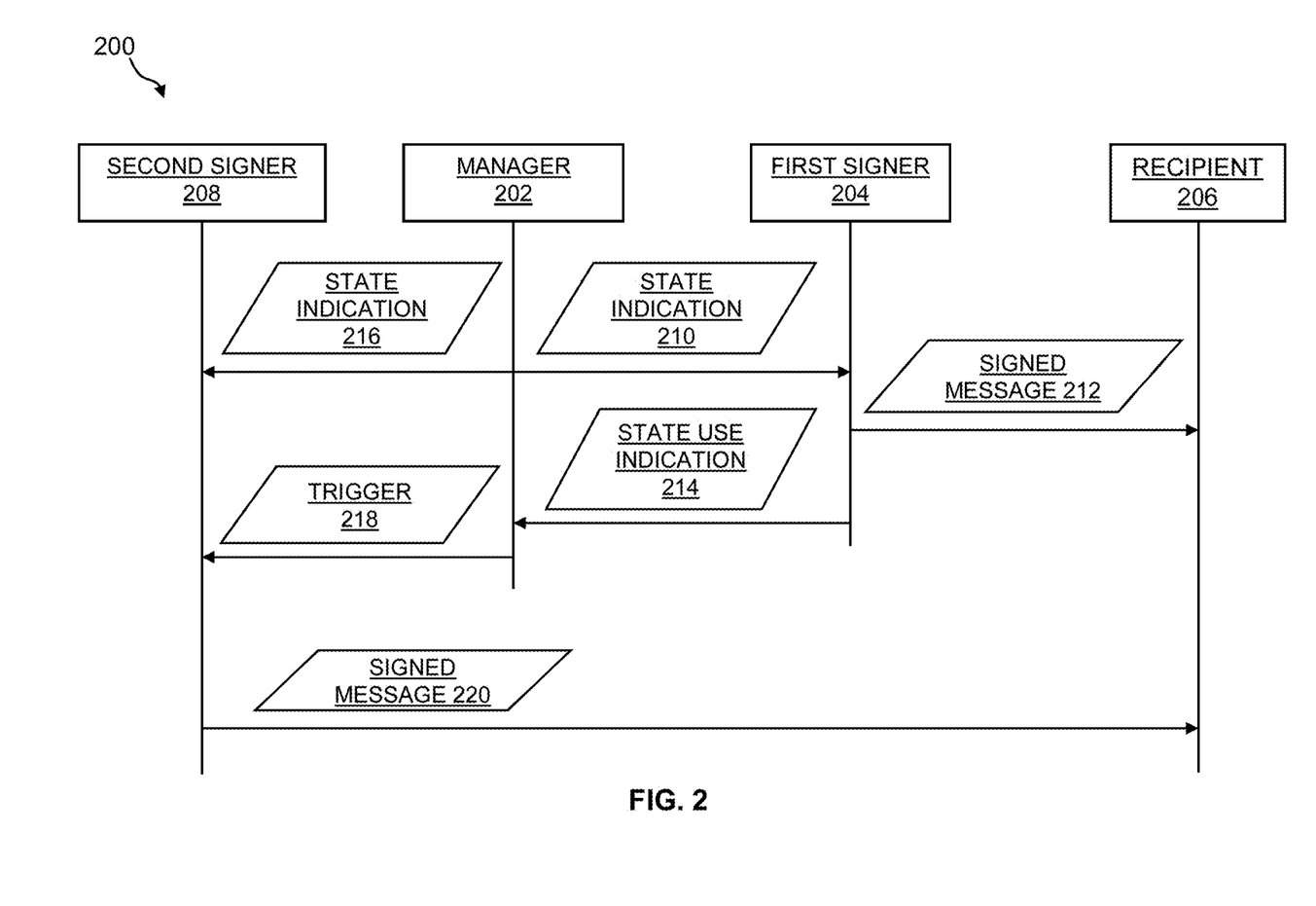
FIG. 2 is a flowchart of an example method of producing a signature under a stateful signature scheme.

FIG. 2 is a flowchart of an example method 200 of producing a signature under a stateful signature scheme. In some examples, a part of the method 200 may be implemented by the computing device 100 or other computing devices or machine-readable media described herein. The flowchart depicts interactions between a manager 202 (such as an entity trusted to manage the mapping between states and time intervals in the set 104), a first signer 204, a recipient 206 (such as a user device to verify signatures) and a second signer 208. In some examples, the first signer 204 implements the functionality of the computing device 100 of FIG. 1 (and other examples described herein). In some examples, the second signer 208 also implements the functionality of the computing device 100 of FIG. 1 (and other examples described herein), for example, in the event of failure of the first signer 204.

The first signer 204 is to be the entity that is responsible for signing messages initially under the stateful signature scheme. In order to enable the first signer 204 to sign messages, the manager 202 may send a state indication 210 to the first signer. The state indication 210 is indicative of the set 104 of states and corresponding set 104 of time intervals that is to be stored in the first signer 204 (e.g., in the manner described in relation to the computing device 100).

In some examples, the first signer 204 is provided with the private seed value, which is used along with the state associated with a signing time, to produce a signature based on the state. The private seed value may be provided by the manager 202 (e.g., along with the state indication 210 if the manager 202 is not a signer) or provided to the first signer 204 in another way such as inputted to the first signer 204 via an interface of the first signer 204. An example implementation may be that the private seed value is printed out as a quick response (QR) code and kept in a secure location. The private seed value may then be extracted from the printed QR code via the interface. In some examples, the manager 202 is another computing device 100 such as an HSM. In some examples, the first signer 204 may generate the private seed value itself. The private seed value may be sent (e.g., in encrypted form) to the second signer 208 e.g., via the manager 202 or directly.

The resultant signed message 212 is sent by the first signer 204 (e.g., via a computing and network infrastructure) to the recipient 206, which can verify the signed message 212 based on the public key.

In some examples, to facilitate verification of the signed message 212, the first signer 204 may send the (one-time) signature and information (i.e., an authentication path) needed for verifying the signature to allow the recipient 206 to verify that a candidate public key derived from the signature is contained in the Merkle tree. The authentication path for a given state indicates the nodes and/or public keys contained in the Merkle tree for the stateful signature scheme to allow a root public key for the stateful signature scheme to be computed.

In some examples, to verify the signed message 212, the recipient 206 may compute a candidate OTS public key. The recipient 206 can then verify that the candidate OTS public key is contained in the Merkle tree with the public key as its root node. The recipient 206 may compute a candidate OTS public key from the signature and the message 212. Using the state and the authentication path, the recipient 206 may verify that the candidate OTS public key is contained in the Merkle tree with the public key as its root node. If the verification procedure is successful, the recipient 206 may accept the signature as valid and the message as authentic.

There may be certain conditions needed in order to implement the stateful signature scheme. For example, there may be no more than one signer active to produce signatures at any one point in time. Further, the manager 202 may not be authorized to produce signatures. In some examples, there may be multiple managers 202, which may be set up to back up the private seed value and/or the set 104 of states and time intervals (e.g., mapping) at any point in time. In some examples, the mapping and/or the private seed value may be backed up elsewhere in case of failure of the manager 202 itself. In some examples where the manager 202 can also function as a signer, the manager 202 may assume the role of the authorized signer if the first signer 204 fails. In other words, in some examples, the manager 202 may be a backup signer. In some examples, a further backup of the mapping and/or private seed value may be needed in case the manager 202 itself could be deployed as the authorized signer (although in other examples, such a backup may not be needed). The first signer 204 and any future signers such as the second signer 208 may have access to a common (global) clock so that the signers do not accidentally sign based on the same state due to their clocks not being aligned to provide the same reference time, which is used to identify the time interval.

In some examples, if the first signer 204 fails, the second signer 208 may be authorized to assume the signing role of the failed first signer 204. Although FIG. 2 depicts the second signer 208 taking over the role of producing signatures under the stateful signature scheme, in another example, the manager 202 (where it also provides functionality of a signer) may take over the role of producing signatures, as explained herein. In some examples where the manager 202 is a potential backup signer to the first signer 204 (e.g., instead of there being both a manager 202 and a second signer 208 as depicted by FIG. 2), the first signer 204 and the backup signer (e.g., the manager 202) may both have the private seed value and the mapping. The backup signer may enforce that they are not to sign while the first signer 204 is operational. In some examples, the backup signer may be provided with a public key corresponding to the first signer 204 or a symmetric key shared with the first signer 204. Any update to the mapping may be signed or include a MAC provided by the first signer 204 and passed to the backup signer, which may verify the update was produced by the first signer 204 and apply the update to its own mapping, if the update is valid.

Rather than relying on the first signer 204 to maintain its own state (e.g., via a counter), the first signer 204 may retrieve and use the current time to compute a state. Since time is monotonic, states are not reused to produce signatures (assuming the first signer 204 has access to a trusted clock and no more than one signature can be produced per time interval).

As indicated herein, signature production rate limiting may be used to ensure that multiple signatures are not generated in the same epoch using the same state (i.e., within the same time interval). The rate limit may be determined based on several factors. At some point in time, a seed key pair (comprising the private seed value) associated with the states expires (e.g., in view of the highest state value being reached), meaning that no more signatures can be produced based on the seed key pair. The time interval in which at most one signature can be produced has a duration defined by the window, w. The parameter w may depend on the upper bound on the number of signatures that can be produced using the key pair and the expected lifetime of the key pair. If the signing time is beyond the expiry time, the computed state does not belong to the space of possible states. In this case, the signer may verify whether the computed state is in the state space before then using it to sign. Thus, the signers 204, 208 may check that the state (derived from the time) is no higher than the upper bound of potential states under the stateful signature scheme.

In some examples, the first signer 204 may send a state use indication 214 to the manager 202. The state use indication 214 may be indicative of which states have or have not been used to produce signatures. In some examples described below, a state that has not been used (but is associated with an elapsed time interval) may be redeployed by the manager 202 for use, either by the first signer 204 itself (e.g., via a replacement set 104 of states and corresponding set 104 of time intervals) or by the second signer 208. Redeployment of states that are associated with elapsed time intervals may decrease state loss and increase the number of signatures that can be produced for a given stateful signature scheme compared with a scenario where a state was not used to produce a signature during an elapsed time interval and that unused state is not otherwise redeployed as described herein.

In some examples, the manager 202 may send a state indication 216 (which may provide the same information as the state indication 210) to the second signer 208. The state indication 216 may be sent at the same time as the state indication 210 is sent, as shown, or the state indication 216 may be sent at a later time. The state indications 210, 216 may be sent in such a way that allows the first signer 204 and second signer 208 to authenticate the manager 202 (e.g., using a signature or MAC applied to the state indication 210, 216 by the manager 202).

In some examples, the second signer 208 may receive a trigger 218 from the manager 202 to authorize the second signer 208 to assume the role of signer for the stateful signature scheme (e.g., as a result of the first signer 204 failing). Thus, the second signer 208 may produce a signature on a message based on an available state according to the signing time and then send the signed message 220 to the recipient 206. In some examples, the trigger 218 may comprise the state indication 216.

As mentioned previously, if the first signer 204 fails, the system establishes a new signer (in this example, the second signer 208). Before signing, the second signer 208 may be prevented from producing any signatures for a first window w (seconds) such as at least one time interval, in case the first signer 204 signed at a signing time just before failing (and the time interval including the signing time has not yet elapsed). After the first window has passed, the second signer 208 can then start producing signatures at a rate of one signature every w seconds, using the state calculated from the time.

The following example illustrates the effect of rate limiting on the rate of signatures that can be produced. Consider the states, x, in a state space $0 \leq x \leq 2^{20}-1$ (which equals 1048576 states in total). In an example, the time interval may be based on an expectation that a private seed value and public key is to be in use for a total time such as one year (=31536000 seconds). Thus, based on the ratio of the total time to the total number of states, a state may be derived from the time (initiated at time 0) such that a signer is to produce at most one signature every 31 seconds (i.e., w=31 seconds). For example, the first 31 seconds (i.e., 0<signing time≤31 seconds) may be mapped to the first state (value=0), the next 31 seconds (i.e., 31<signing time≤62 seconds) may be mapped to the second state (value=1) and so on.

If the first signer 204 fails, the second signer 208 may retrieve the private seed value from backup and wait 31 seconds (in case the original signer produced a signature immediately before it failed). The second signer 208 can then sign at the same rate as the first signer 204 by retrieving the time and computing the counter for each time interval.

If the time exceeds the expiry point (i.e., 31536000 seconds), the state computed may exceed the total number of states (i.e., 1048576), which the signer 204, 208 may recognize is not in the state space and is not to be used to produce signatures. Instead, the seed key pair may be indicated as expired and is to no longer be used.

The method 200 may therefore allow a backup of the private seed value to be stored, without risking state reuse such as may otherwise occur by retrieving an older state from backup.

In some examples, rather than a signer retrieving the time every time it needs to compute a signature, the signer may retrieve the time once in a longer period, and then maintain this state until it next retrieves the state while still respecting a maximum number of signatures that can be produced in the time interval.

Consider the example where the signer can produce a signature every 31 seconds. Instead of the signer retrieving the time to compute the state every time it signs (at most once every 31 seconds), it may instead retrieve the time every 310 seconds, and in this time interval maintain its own state (e.g., via a counter) but produce no more than ten signatures in the epoch corresponding to 310 second time period.

For example, if no signatures are produced within the first half of the epoch, ten signatures can still be produced within the remaining half of the epoch since the signer may maintain its own state to prevent state reuse. In other words, the five states that would have otherwise been available in the first half of the epoch (based on the previous example) to produce five signatures are still available to be used in the second half of the epoch (so that up to ten signatures can be produced in the second half). Maintaining the state in this way may allow the signer to use states associated with intervals that have passed. However, a backup signer may not be authorized to produce signatures until the epoch has passed to ensure that none of the states associated with the epoch are reused by the backup signer.

In another example, say the signer has to sign a message, the signer is to retrieve the time and produce a signature in a first time interval. If the signer then receives no messages for a few minutes, but then receives nine messages to sign towards the end of the 310 seconds, this trade-off may allow the signer to produce up to the full ten signatures before 310 seconds is reached. In contrast to the example where the time is retrieved each time a signature is to be produced (and unused states are lost), if the signer receives nine messages at the end of the 310 second window (e.g., in the last 31 seconds), the signer can still produce signatures for the nine messages in the last 31 seconds, meaning that the states associated with the second signature to the tenth signature (i.e., based on the second to tenth states) are not lost.

In some examples, in case of signer failure, a new signer may have to wait until expiry of the epoch (e.g., 310 seconds) before being promoted to sign messages. However, in some examples, if not all states were used in the epoch, the new signer could be informed (e.g., by the original signer or a manager) about which states have not been used (in some examples, the mapping may be updated to indicate which states are available for the corresponding time intervals). In such examples, the new signer could be promoted before the expiry of the epoch.

The examples where the signer may maintain its state over an epoch may be a compromise between a signer maintaining its own state and having to retrieve the time for every signature.

In some examples, the signer may periodically communicate (over an authenticated channel) with the manager to update the mapping (between the set of states and the corresponding set of time intervals) from the time to the set of states. For example, rather than using the function f(t) that maps time (t) to (state), the signer may use the f(t) that maps to state minus x, where x is the number of unused signatures in the previous epoch. In other similar words, if no signatures are produced over a certain number of time intervals, the corresponding unused states can be redeployed via the state indication 210 or 216. This example may be useful if the signer does not produce the maximum number of signatures in an epoch so that state wastage may be reduced. The maximum number of signatures may still be enforced in this example, otherwise there is a risk of state reuse.

The computing devices and methods described herein may allow only one signer to be active at any one time in the signing ecosystem. The signer may have access to a globally agreed time and may determine an (input) state to generate a signing key from the time. Each state (or a set of states) may be mapped to a unique, exclusive time interval. Thus, after a time interval expires, the state cannot be used unless the state has never been used and the state is redeployed. If the signer fails, another signer may be authorized to generate signatures under the stateful signature scheme after a specified period of time (which may be determined by the expiry of the last unique time interval in which the previous signer could have generated a signature).

Some examples relating to the above are now described.

Figure 3:
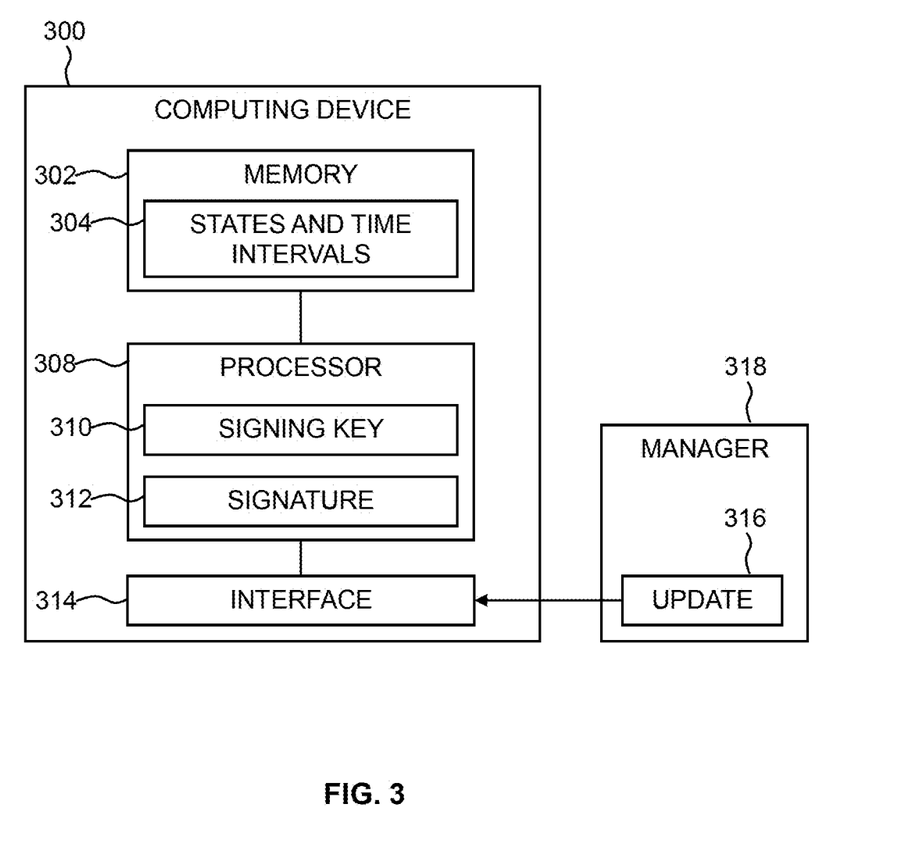
FIG. 3 is a schematic drawing of an example computing device to produce a signature under a stateful signature scheme.

FIG. 3 is a schematic drawing of an example computing device 300 to produce a signature under a stateful signature scheme. Reference numerals for features of the computing device 300 that are similar to or have corresponding functionality to features of the computing device 100 of FIG. 1 are incremented by 200. In this regard, the computing device 300 implements the same functionality as the computing device 100 and further functionality as described by the examples below. Therefore, certain features depicted by FIG. 1 are omitted from FIG. 3 for brevity.

In some examples, the processor 308 is to produce the signature 312 for a message that is requested to be signed (using the generated signing key 310) at the indicated time. Such a message may be generated by the computing device 300 itself or otherwise provided to the computing device e.g., via an interface 314 of the computing device 300. The interface 314 may transmit or receive data to or from entities communicatively coupled to the computing device 300 (such as the manager 202 and recipient 206 depicted by FIG. 2).

In some examples, the processor 308 is to modify the set 304 of states and corresponding set 304 of non-overlapping time intervals (stored in the memory 302) in response to an update 316 received via the interface 314 of the computing device 300. The update 316 may be indicative of a change to a mapping between the set of states and the corresponding set of non-overlapping time intervals.

In some examples, the modified set 304 of states comprises an unused state mapped to an elapsed time interval. In some examples, there may be scenarios where a previous signer did not use an available state associated with an elapsed time interval and therefore the state could be redeployed to avoid state wastage by modifying the set of states and corresponding set of time intervals accordingly.

In some examples, the update 316 is to modify a duration of the time interval in the set of non-overlapping time intervals. In some examples, a different message signing rate may be anticipated and therefore it may be useful to adjust the duration of the time interval to accommodate the anticipated signing rate by modifying the set of states and corresponding set of time intervals accordingly.

An entity such as a manager 318 may provide the update 316, as depicted by FIG. 3. The manager 318 may provide the same or similar functionality to the manager 202 of FIG. 2. In some examples, another signer may provide the update 316 (e.g., in the case that the computing device 300 corresponds to the second (backup) signer 208 and the other signer is the first signer 204).

In some examples, the update is authenticated (e.g., by the manager 318 or the first signer 204) to enable the computing device 300 to verify authenticity of the update 316. In some examples, an update authenticated by the first signer 204 may be passed via the manager 318 to the computing device 300.

In some examples, the update 316 may be authenticated by the manager 318 or the first signer 204 (depending on whether the manager 318 or first signer 204 provided the update) by applying a signature to the update 316 using a private key of the manager 318 or the first signer 204, which can be verified by the computing device 300 using the corresponding public key of the manager 318 or the first signer 204, respectively. In some examples, a message authentication code (MAC) such as a hash-based MAC (HMAC) may be applied to the update 316 by the manager 318 or the first signer 204 to allow the computing device 300 to authenticate the update 316. In some examples, the update 316 may be encrypted by manager 318 or the first signer 204 such that successful decryption by the computing device 300 using a key shared in a trusted way may allow the computing device 300 to authenticate the update 316.

Figure 4:
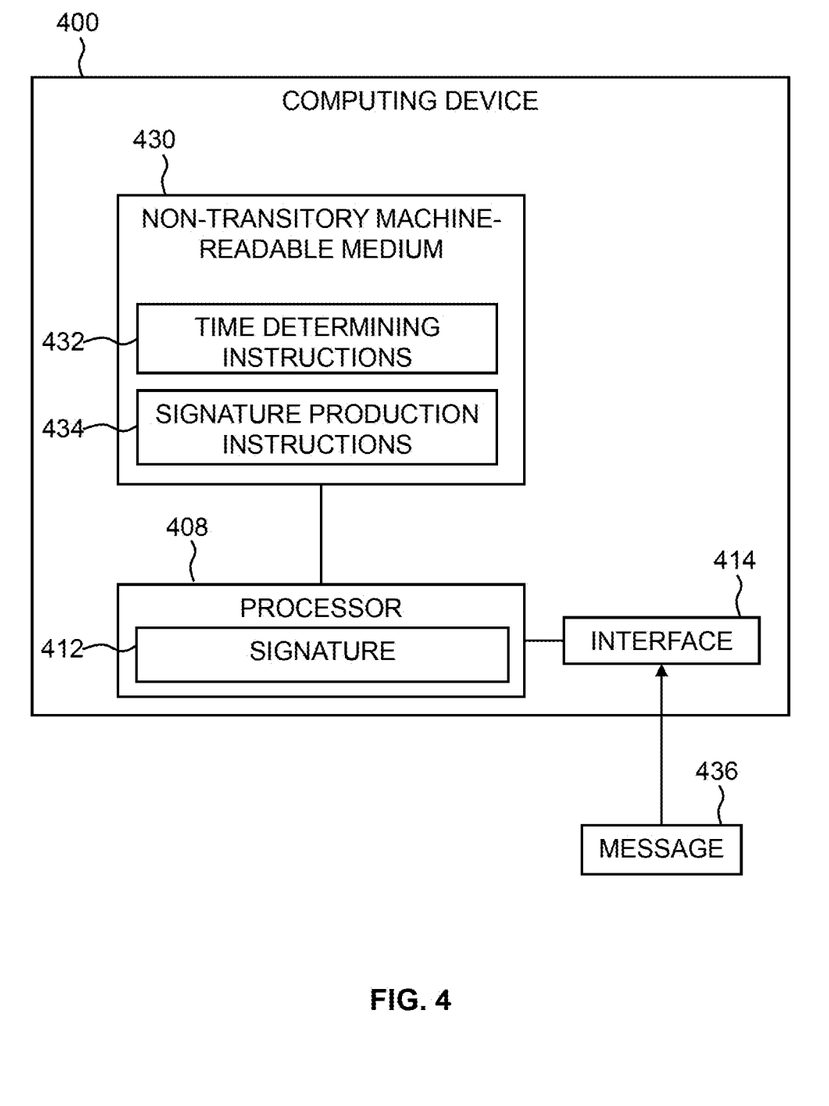
FIG. 4 is a schematic drawing of an example computing device to produce a signature under a stateful signature scheme.

FIG. 4 is a schematic drawing of an example computing device 400 to produce a signature under a stateful signature scheme. Reference numerals for features of the computing device 400 that are similar to or have corresponding functionality to features of the computing device 100 of FIG. 1 are incremented by 300. The computing device 400 may implement similar functionality to the computing device 100 (and provide similar technical results as described previously). Thus, further details of the features of the computing device 400 with similar functionality to the features of the computing device 100 can be understood with reference to the description of the computing device 100 and related examples.

The computing device 400 comprises a processor 408, an interface 414 and a non-transitory machine-readable medium 430.

As used herein, the term "non-transitory" does not encompass transitory propagating signals.

The non-transitory machine-readable medium 430 stores instructions readable and executable by the processor 408. The instructions comprise time determining instructions 432 and signature production instructions 434.

The time determining instructions 432 instruct the processor 408 to determine a signing time at which a message 436 is to be signed. The message 436 is to be received via the interface 414. The signing time may be provided by a timing unit 106 such as described in relation to FIG. 1.

The time determining instructions 432 further instruct the processor 408 to identify a time interval, from a set of time intervals (e.g., the set 104), that includes the signing time. The time interval is associated with a unique state.

The signature production instructions 434 instruct the processor 408 to produce a signature 412 for the message 436 with a signing key. The signing key is generated by using the unique state as an input to generate the signing key under a stateful signature scheme.

Figure 5:
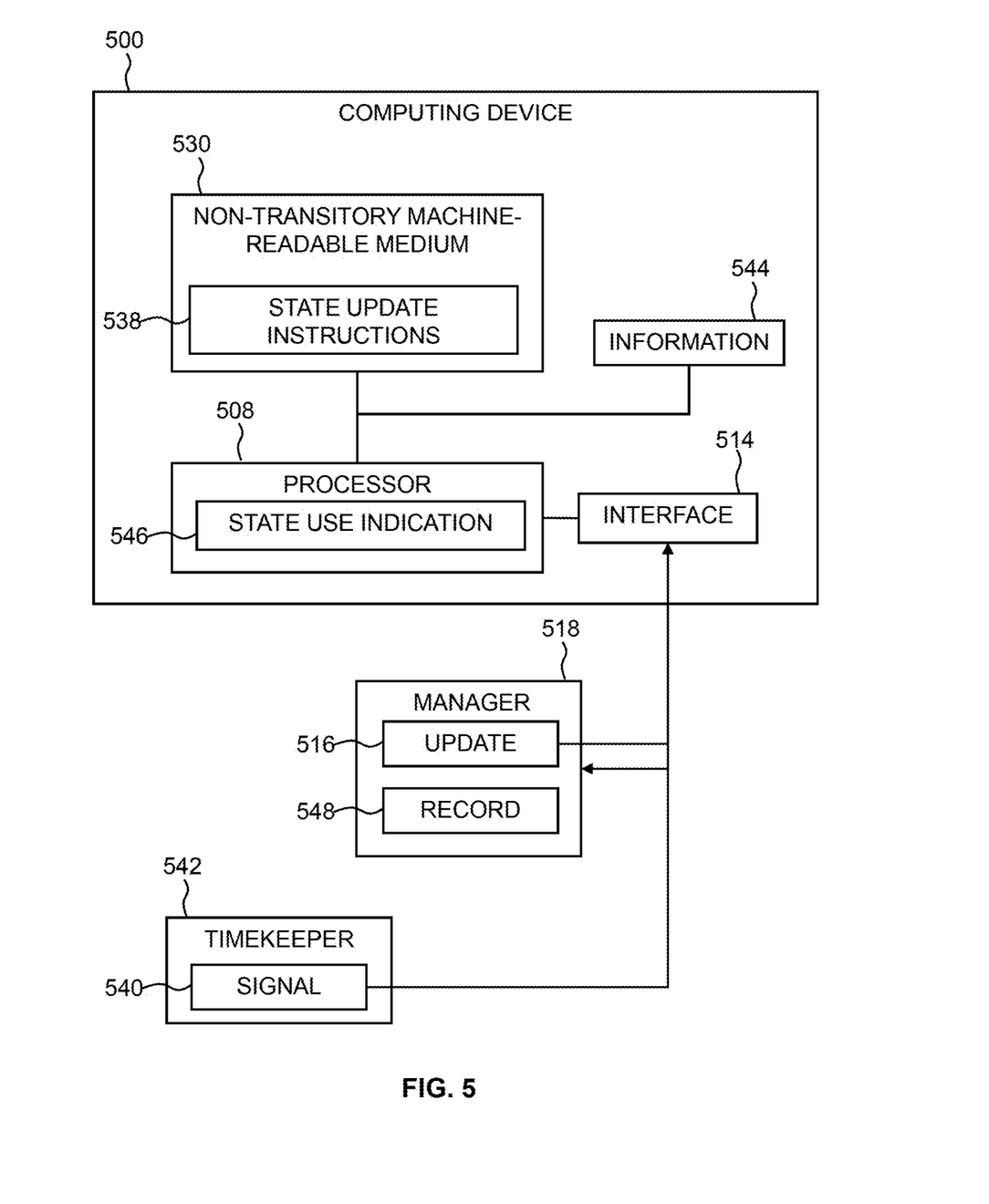
FIG. 5 is a schematic drawing of an example computing device to produce a signature under a stateful signature scheme.

FIG. 5 is a schematic drawing of an example computing device 500 to produce a signature under a stateful signature scheme. Reference numerals for features of the computing device 500 that are similar to or have corresponding functionality to features of the computing device 400 of FIG. 4 are incremented by 100. In this regard, the computing device 500 implements the same functionality as the computing device 400 and further functionality as described by the examples below. Therefore, certain features depicted by FIG. 4 are omitted from FIG. 5 for brevity.

The computing device 500 comprises a processor 508, an interface 514 and a non-transitory machine-readable medium 530.

The non-transitory machine-readable medium 530 stores instructions readable and executable by the processor 508. The instructions comprise the same instructions as stored in the computing device 400. For the purpose of the description given below, the instructions of the computing device 500 further comprise state update instructions 538.

In some examples, the signing time is determined from a signal 540 received from a timekeeper 542 (such as a trusted server) via the interface 514. The signal 540 is indicative of a globally trusted time. Thus, even if another computing device is promoted to be the sole-authorized signer, the other computing device can access the same time as the computing device 500 and be trusted to not reuse any states based on the mapping. In some examples, the computing device 500 may comprise a timing unit (not shown) such as the timing unit 106 of FIG. 1 to monitor for any time updates and/or keep time for the computing device 500.

In some examples, the signing time is determined based on a time indicated by a clock of the computing device 500.

In some examples, the clock may implement the functionality of the timing unit 106 of FIG. 1.

In some examples, the state update instructions 538 are to instruct the processor 508 to store, in the computing device 500, information 544, received via the interface 514, indicative of the set of time intervals and an associated set of unique states. In some examples, the information 544 corresponds to or is indicative of the set 104 of states and time intervals described in relation to FIG. 1. In some examples, the information 544 is provided via an update 516 provided by the manager 518. In some examples, the manager 518 may be a signer such as the first signer 204 depicted by FIG. 2, in which case the computing device 500 may represent the second signer 208.

In some examples, the state update instructions 538 are to instruct the processor 508 to, in response to producing the signature, send a state use indication 546 to the manager 518 via the interface 514. The state use indication 546 is indicative of the unique state used to generate the signing key to produce the signature. The manager 518 is to hold a record 548 on the used unique state. The record 548 may be used by the manager 518 to decide whether to update a mapping between the set of time intervals an associated set of unique states and, if needed, issue the update 516 to the computing device 500 in case the mapping is to be changed for any reason.

The manager 518 may be trusted to maintain the mapping, providing the computing device 500 is also trusted to provide an accurate state use indication 546. The computing device 500 (and any other potential signer that is not yet authorized to produce signatures) may receive an initial mapping from the manager 518. In some examples, the initial mapping could be shared alongside the private seed value. In some examples, the private seed value may be shared separately (e.g., in case of sharing the initial mapping with multiple potential signers) so that a single signer authorized to sign has a copy of the private seed value. In some examples, even if an update to the mapping is not received by an authorized signer, the initial mapping may still be used so that state reuse may be avoided.

A signer may be solely authorized to produce the signature as a result of being informed of the set of time intervals and associated set of unique states and the seed. If the signer does not have both the set and the seed, the signer may not be authorized to produce signatures.

In some examples, the mapping could be shared between signers. For example, an initial signer may sign data indicative of the mapping and send the signed data to a subsequent signer. If the subsequent signer has the public key, the signed data could be passed through any indirect channel between the initial signer and the subsequent signer.

Figure 6:
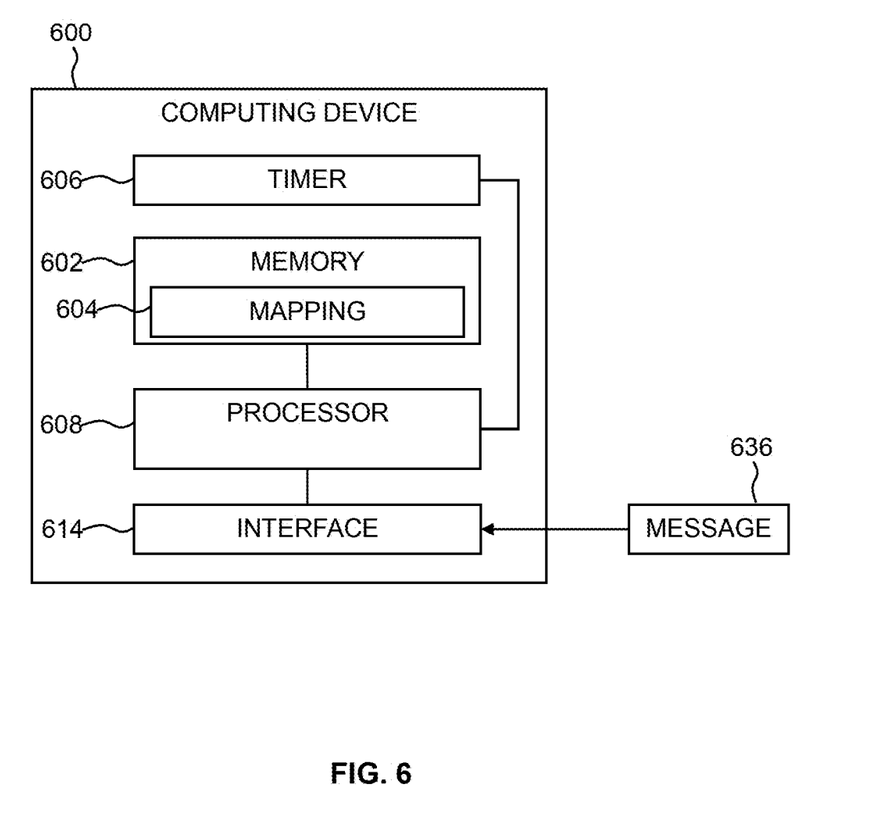
FIG. 6 is a schematic drawing of an example computing device to produce a signature under a stateful signature scheme.

FIG. 6 is a schematic drawing of an example computing device 600 to produce a signature under a stateful signature scheme. Reference numerals for features of the computing device 600 that are similar to or have corresponding functionality to features of the computing device 100 of FIG. 1 are incremented by 500. The computing device 600 may implement similar functionality to the computing device 100 (and provide similar technical results as described previously). Thus, further details of the features of the computing device 600 with similar functionality to the features of the computing device 100 can be understood with reference to the description of the computing device 100 and related examples.

The computing device 600 comprises a memory 602, a timer 606, a processor 608 and an interface 614.

The interface 614 is to receive a message 636 to sign.

The memory 602 is to store a mapping 604 between a set of states that are available under a stateful signature scheme and an associated set of time intervals. The mapping 604 may be similar to or correspond to the set 104 of states and time intervals described in relation to FIG. 1.

The timer 606 is to indicate a time interval during which the message 636 is to be signed.

The processor 608 is to determine, from the mapping 604, a state associated with the indicated time interval.

The processor 608 is further to input the state to derive a signing key under the stateful signature scheme.

The processor 608 is further to apply a signature to the message 636 using the signing key.

Figure 7:
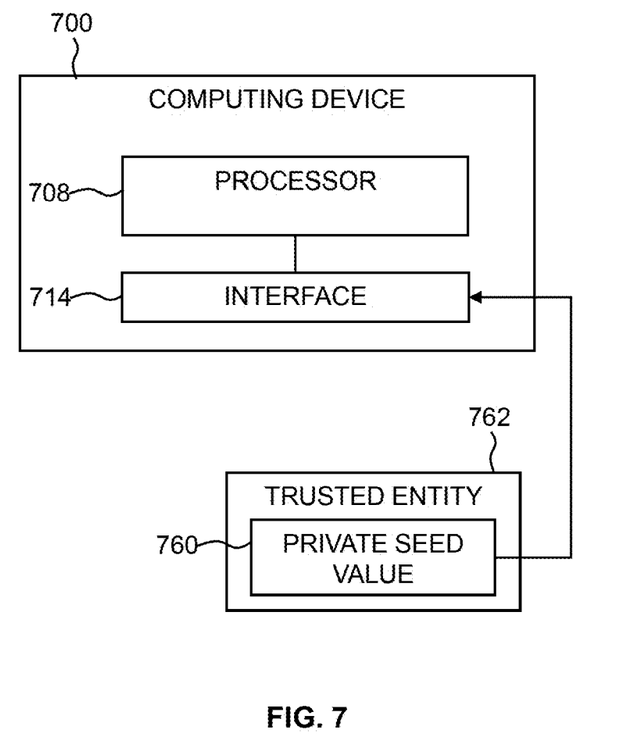
FIG. 7 is a schematic drawing of an example computing device to produce a signature under a stateful signature scheme.

FIG. 7 is a schematic drawing of an example computing device 700 to produce a signature under a stateful signature scheme. Reference numerals for features of the computing device 700 that are similar to or have corresponding functionality to features of the computing device 600 of FIG. 6 are incremented by 100. In this regard, the computing device 700 implements the same functionality as the computing device 600 and further functionality as described by the examples below. Therefore, certain features depicted by FIG. 6 are omitted from FIG. 7 for brevity.

In some examples, a duration of the time interval is determined based on a total number of signatures that can be produced based on a seed key pair under the stateful signature scheme.

In some examples, a duration of the time interval is determined based on an intended lifetime of the seed key pair.

In some examples, a duration of the time interval is determined based on an anticipated rate of messages to be signed during the intended lifetime In some examples, a duration of the time interval is determined based on a combination of the examples described above.

The duration of the time interval may be selected as appropriate depending on the anticipated signing rate e.g., to provide a balance between being able to sign a message as soon as possible after receiving the message and maximizing the lifetime of the seed key pair associated with the stateful signature scheme.

In some examples, the processor 708 is to verify that the state is an available state of the stateful signature scheme (e.g., by accessing a record stored in the computing device 700 of the upper bound state of the stateful signature scheme). For example, such a verification may ensure that the state does not exceed the upper bound state associated with the stateful signature scheme.

In some examples, the processor 708 is to obtain, via the interface 714, a private seed value 760 stored in a trusted entity 762 as a result of the computing device 700 being authorized to apply the signature under the stateful signature scheme. The private seed value 760 is a further input to derive the signing key. The trusted entity 762 may be a computing device such as another signer (but which is not authorized to produce signatures), a dedicated store or may comprise a medium such as a printed QR code (as described above).

Any of the blocks, nodes, instructions or modules described in relation to the figures may be combined with, implement the functionality of or replace any of the blocks, nodes, instructions or modules described in relation to any other of the figures. For example, methods may be implemented as machine-readable media or computing devices, machine-readable media may be implemented as methods or computing devices, and computing devices may be implemented as machine-readable media or methods. Further, any of the functionality described in relation to any one of a method, machine readable medium or computing device described herein may be implemented in any other one of the method, machine readable medium or computing device described herein. Any claims written in single dependent form may be re-written, where appropriate, in multiple dependency form since the various examples described herein may be combined with each other.

Examples in the present disclosure can be provided as methods, systems or as a combination of machine-readable instructions and processing circuitry. Such machine-readable instructions may be included on a non-transitory machine (for example, computer) readable storage medium (including but not limited to disc storage, CD-ROM, optical storage, flash storage, etc.) having computer readable program codes therein or thereon.

The present disclosure is described with reference to flow charts and block diagrams of the method, devices and systems according to examples of the present disclosure. Although the flow charts described above show a specific order of execution, the order of execution may differ from that which is depicted. Blocks described in relation to one flow chart may be combined with those of another flow chart. It shall be understood that each block in the flow charts and/or block diagrams, as well as combinations of the blocks in the flow charts and/or block diagrams can be realized by machine readable instructions.

The machine-readable instructions may, for example, be executed by a general-purpose computer, a special purpose computer, an embedded processor or processors of other programmable data processing devices to realize the functions described in the description and diagrams. In particular, a processor or processing circuitry, or a module thereof, may execute the machine-readable instructions. Thus, functional nodes, modules or apparatus of the system and other devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine-readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by block(s) in the flow charts and/or in the block diagrams.

Further, the teachings herein may be implemented in the form of a computer program product, the computer program product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the scope of the present disclosure. It is intended, therefore, that the method, apparatus and related aspects be limited by the scope of the following claims and their equivalents. It should be noted that the above-mentioned examples illustrate rather than limit what is described herein, and that many implementations may be designed without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A computing device comprising:
   a memory to store a set of states and a corresponding set of non-overlapping time intervals; and
   a processor to:
      identify a time interval of the set of non-overlapping time intervals that includes a time at which a signature is to be produced;
      generate a signing key based on a state associated with the time;
      produce a signature, under a stateful signature scheme, with the signing key; and
      modify the set of states and the corresponding set of non-overlapping time intervals in response to an update received via an interface of the computing device, wherein the update is indicative of a change to a mapping between the set of states and the corresponding set of non-overlapping time intervals.

2. The computing device of claim 1, wherein the processor is to produce the signature for a message that is requested to be signed at the time.

3. The computing device of claim 1, wherein the modified set of states comprises an unused state mapped to an elapsed time interval.

4. The computing device of claim 1, wherein the processor is to modify a duration of the time interval of the set of non-overlapping time intervals in response to the update.

5. The computing device of claim 1, wherein the update is authenticated to enable the computing device to verify authenticity of the update.

6. A non-transitory machine-readable medium storing instructions readable and executable by a processor of a computing device to:
   determine a signing time at which a message is to be signed, wherein the message is received via an interface of the computing device;
   identify a time interval, from a set of time intervals, that includes the signing time, wherein the time interval is associated with a unique state;
   produce a signature for the message with a signing key, wherein the signing key is generated by using the unique state as an input to generate the signing key under a stateful signature scheme; and
   in response to producing the signature, send a state use indication to a manager via the interface, wherein the state use indication is indicative of the unique state used to generate the signing key to produce the signature, and wherein the manager is to hold a record on the used unique state.

7. The non-transitory machine-readable medium of claim 6, wherein the instructions are readable and executable by the processor to determine the signing time from a signal received via the interface, wherein the signal is indicative of a globally trusted time.

8. The non-transitory machine-readable medium of claim 6, wherein the instructions are readable and executable by the processor to determine the signing time based on a clock of the computing device.

9. The non-transitory machine-readable medium of claim 6, wherein the instructions are readable and executable by the processor to store, in a memory of the computing device, information received via the interface that is indicative of the set of time intervals and an associated set of unique states.

10. A computing device comprising:
an interface to receive a message to sign;
a memory to store a mapping between a set of states that are available under a stateful signature scheme and an associated set of time intervals; and
a processor to:
determine, from the mapping, a state associated with a time interval during which the message is to be signed;
derive a signing key under the stateful signature scheme based on the state;
apply a signature to the message using the signing key; and
modify the mapping between the set of states that are available under the stateful signature scheme and the associated set of time intervals in response to an update received via the interface.

11. The computing device of claim 10, wherein the processor is to determine a duration of the time interval based on:
a total number of signatures that can be produced based on a seed key pair under the stateful signature scheme;
an intended lifetime of the seed key pair; or
an anticipated rate of messages to be signed during the intended lifetime.

12. The computing device of claim 10, wherein the processor is to verify that the state is an available state of the stateful signature scheme.

13. The computing device of claim 10, wherein the processor is to obtain, via the interface, a private seed value stored in a trusted entity as a result of the computing device being authorized to apply the signature under the stateful signature scheme.

14. The computing device of claim 13, wherein the processor is to derive the signing key under the stateful signature scheme based on the private seed value.

15. The computing device of claim 10, wherein the modified mapping comprises an unused state mapped to an elapsed time interval.

16. The computing device of claim 10, wherein the processor is to modify a duration of the time interval in response to the update.

17. The computing device of claim 10, wherein the update is authenticated to enable the computing device to verify authenticity of the update.

18. The computing device of claim 10, wherein the processor is to send a state use indication to a second computing device via the interface in response to applying the signature to the message using the signing key.

19. The computing device of claim 1, wherein the processor is to send a state use indication to a second computing device via the interface in response to producing the signature.

20. The non-transitory machine-readable medium of claim 9, wherein the instructions are readable and executable by the processor to modify the set of time intervals and the associated set of unique states in response to an update received via the interface, wherein the update is indicative of a change to a mapping between the set of time intervals and the associated set of unique states.

* * * * *